(12) United States Patent
Kataoka (10) Patent No.: US 9,009,361 B2
(45) Date of Patent: Apr. 14, 2015

(54) VIDEO PROCESSING SYSTEM, VIDEO OUTPUT APPARATUS, VIDEO DISPLAY APPARATUS AND VIDEO PROCESSING METHOD

(71) Applicant: Kabushiki Kaisha Toshiba, Tokyo (JP)

(72) Inventor: Satoshi Kataoka, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 2 days.

(21) Appl. No.: 13/926,936

(22) Filed: Jun. 25, 2013

(65) Prior Publication Data

US 2014/0375878 A1  Dec. 25, 2014

(51) Int. Cl.
*G06T 3/40* (2006.01)
*H04N 7/01* (2006.01)
*H04N 7/015* (2006.01)
*G09G 5/00* (2006.01)
*H04N 21/4363* (2011.01)
*H04N 5/775* (2006.01)

(52) U.S. Cl.
CPC .............. *G06T 3/4092* (2013.01); *H04N 5/775* (2013.01); *H04N 7/0117* (2013.01); *H04N 7/0125* (2013.01); *H04N 7/015* (2013.01); *G09G 5/00* (2013.01); *H04N 21/43635* (2013.01)

(58) Field of Classification Search
CPC .................................................... G06T 3/4092
USPC ................................................. 710/14, 16, 18
See application file for complete search history.

(56) References Cited

U.S. PATENT DOCUMENTS

| | | | |
|---|---|---|---|
| 7,787,051 B2 | 8/2010 | Okumoto | |
| 2010/0013999 A1* | 1/2010 | Momosaki | 348/581 |
| 2010/0053425 A1 | 3/2010 | Okumoto | |
| 2010/0079666 A1* | 4/2010 | Osanai | 348/441 |
| 2011/0280543 A1* | 11/2011 | Uchida et al. | 386/230 |

FOREIGN PATENT DOCUMENTS

| | | |
|---|---|---|
| JP | 2010-054940 | 3/2010 |
| JP | 2011-119828 | 6/2011 |

OTHER PUBLICATIONS

European Application No./Patent No. 13184946.5; Extended European Search Report; Mailed Feb. 19, 2014.

* cited by examiner

*Primary Examiner* — Farley Abad
(74) *Attorney, Agent, or Firm* — Blakely, Sokoloff, Taylor & Zafman LLP (57) ABSTRACT

According to one embodiment, a video output device includes a first resolution converter and a first determination module. The first determination module is configured to determine whether a first level indicating the performance of resolution conversion processing of the first resolution converter is higher than a second level. The first resolution converter is configured to convert video data with a first resolution into one with a second resolution when the first level is higher than the second level.

8 Claims, 6 Drawing Sheets

| SUPER-RESOLUTION LEVEL | SHARPENING | NOISE REDUCTION |
|---|---|---|
| 1 | HIGH | WEAK |
| 2 | LOW | STRONG |
| 3 | LOW | WEAK |

FIG.8

VIDEO PROCESSING SYSTEM, VIDEO OUTPUT APPARATUS, VIDEO DISPLAY APPARATUS AND VIDEO PROCESSING METHOD

FIELD

Embodiments described herein relate generally to a video processing system, a video output device, a video display device, and a video processing method.

BACKGROUND

Recently, display panels for televisions with a higher resolution of 4k2k (3840×2160 pixels) have been introduced in the market, and the products such as 4k2k televisions are drawing more attention. The resolution of 4k2k has pixels four times as many as the resolution of Fill High Definition (Full HD) (1920×1080 pixels), and thus video containing a large amount of information can be output with a higher resolution than Full HD.

As a technique to transmit signals from a video output device to a video display device, a High-definition Multimedia Interface (HDMI) is used generally. In the HDMI, a video output device outputting video such as a DVD player acquires, from a video display device such as a television, extended display identification data (EDID), which is information indicating resolutions supported by the video display device, and determines a resolution based on the acquired EDID to perform output.

The HDMI standard defines available resolutions for outputting, and the latest HDMI standard (1.4b) also supports 4k2k video output. It has been possible recently to convert video data with a Full HD resolution into one with a 4k2k resolution to display the converted video clearly with a higher resolution.

When both the video output device and the video display device have a resolution conversion function for converting video data with a Full HD resolution into one with a 4k2k resolution, and their performance of resolution conversion function are different, the image quality of the video data varies depending on which performs resolution conversion, the video output device or the video display device.

However, the video output device conforming to the current HDMI standard acquires resolutions that can be received by the video display device from the EDID to perform output with a maximum resolution. Thus, for the video display device with a 4k2k resolution, the resolution of the video data is always converted into 4k2k by the video output device, which makes it difficult to display video data with image quality intended by the manufacturer of the video output device.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a video processing system comprises a video output device and a video display device connected to the video output device so that the bidirectional communication is possible. The video output device comprises a first resolution converter, a first reception module, a first determination module, and a first transmission module. The first resolution converter is configured to perform the resolution conversion processing for converting video data with a first resolution into one with a second resolution higher than the first resolution, at a first level indicating the performance of the resolution conversion processing. The first reception module is configured to receive a second level indicating the performance of resolution conversion processing by the video display device, from the video display device through the bidirectional communication. The first determination module is configured to determine whether the first level is higher than the second level. The first transmission module is configured to transmit the video data to the video display device. The first resolution converter is configured to convert the video data with the first resolution into one with the second resolution when the first level is higher than the second level. The video display device comprises a second reception module, a second resolution converter, a second resolution converter, and a display module. The second reception module is configured to receive the video data from the video output device. The second resolution converter is configured to perform the resolution conversion processing for converting the video data with the first resolution into one with the second resolution at the second level. The display module is configured to display the video data with the second resolution. The second resolution converter does not perform the resolution conversion processing when the video data with the second resolution is received.

Figure 1:
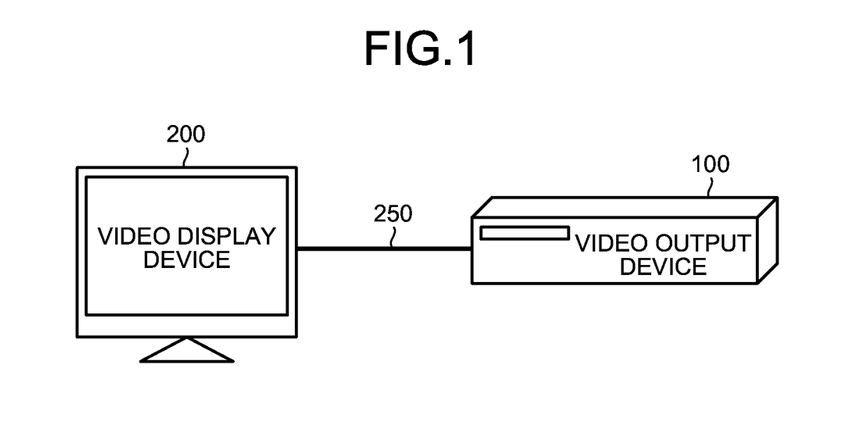
FIG. 1 is an exemplary diagram of a configuration of a video processing system according to an embodiment.

As illustrated in FIG. 1, the video processing system of the embodiment comprises a video output device 100 and a video display device 200.

The video output device 100 is for example a Blu-ray Disc (BD, trademark) player that comprises a BD Driver and can reproduce BDs and DVDs. The video data reproduced by the BD Driver of the video output device 100 is transmitted to the video display device 200. The video display device 200 is for example a television device that receives video data reproduced by the video output device 100 and displays the received video data.

To achieve the display of the video data, the video display device 200 and the video output device 100 of the embodiment are connected through an interface conforming to the HDMI (registered trademark) standard (hereinafter, referred to as an "HDMI" interface). In the embodiment, as illustrated in FIG. 1, the video display device 200 and the video output device 100 are connected through an HDMI cable 250. Thus, video data can be transmitted and received between the video display device 200 and the video output device 100 through the HDMI interface.

The video output device 100 is an HDMI source device, and the video display device 200 is an HDMI sink device.

The HDMI standard defines a display data channel (DDC). The video output device 100 can receive EDID that is information indicating resolutions supported by the video display device 200 from the video display device 200 through the DDC. Here, the DDC is a channel where the EDID of the video display device 200 is transmitted to the video output device 100, and the unidirectional communication from the HDMI sink device to the HDMI source device is possible.

In addition, the consumer electronics control (CEC) standard is defined (hereinafter, referred to as an "HDMI-CEC" or "CEC"). The HDMI-CEC is a standard for achieving a cooperative operation among devices by transmitting control signals through an HDMI cable. In the embodiment, the video display device 200 and the video output device 100 both have a function conforming to the HDMI-CEC standard (hereinafter, referred to as an "HDMI-CEC function"). With the HDMI-CEC function, for example, the video display device 200, such as a television device, and the video output device 100, such as a BD player, perform transmission and reception of control information conforming the HDMI-CEC therebetween through the HDMI interface in bidirectional communication, which makes it possible to operate each other.

In the embodiment, video data with a low resolution in the video output device 100 is displayed on the video display device 200 that enables display with a high resolution. Thus, the resolution conversion for converting video data with a low resolution into one with a high resolution is necessary. In the embodiment, both the video output device 100 and the video display device 200 have a super-resolution conversion function for performing resolution conversion. In the embodiment, the super-resolution conversion function of either the video output device 100 or the video display device 200 is selected based on their performance, and the video data with a low resolution is converted into one with a high resolution using the selected super-resolution conversion function. The following describes the details of the embodiment.

Figure 2:
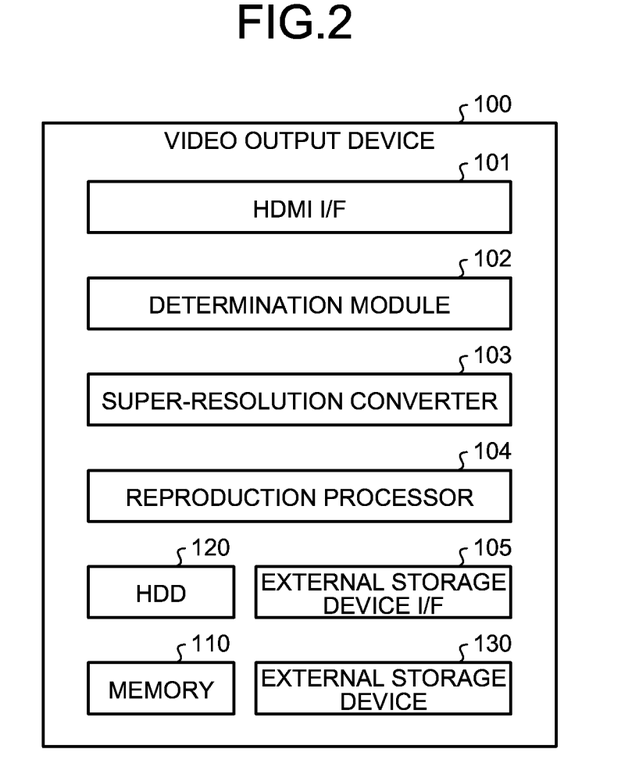
FIG. 2 is an exemplary block diagram of a functional configuration of a video output device in the embodiment.

First, the details of the video output device 100 are described. The video output device 100 mainly comprises an HDMI I/F 101, a determination module 102, a super-resolution converter 103, a reproduction processor 104, a hard disk drive (HDD) 120, a memory 110, an external storage device 130, and an external storage device I/F 105, as illustrated in FIG. 2.

The external storage device 130 performs read/write of video data on a BD or DVD. The external storage device I/F 105 is an interface for controlling read/write of data on a BD or DVD by the external storage device 130. Here, video data with a resolution of Full HD (1920×1080 pixels) is stored in the BD or DVD.

The HDD 120 is a storage medium that can store video data, etc. The memory 110 is a storage medium that stores various kinds of data, such as a flash memory and a random access memory (RAM). The memory 110 of the embodiment stores a super-resolution level and vendor information of the video output device 100, which are described later.

Note that, hereinafter, the resolution of the video data stored in a BD, DVD, HDD, etc. on the side of the video output device 100 is referred to as a first resolution. The resolution that is higher than the first resolution as a low resolution and is a maxim resolution supported by a display of the video display device 200 described later is referred to as a second resolution. The first resolution includes Full HD (1920×1080 pixels) etc., and the second resolution includes 4k2k (3840×2160 pixels) etc., but they are not limited thereto.

The reproduction processor 104 encodes the video data read from the BD or DVD on the external storage device 130, and reproduces the video data.

The HDMI I/F 101 is an interface for controlling transmission of video data through the HDMI cable 250 and transmission and reception of control signals and various kinds of data using the HDMI-CEC, and functions as a first reception module and a first transmission module. To be more specific, the HDMI I/F 101 transmits video data with a second resolution such as 4k2k when the super-resolution converter 103 of the video output device 100 has performed super-resolution conversion, and transmits video data with a first resolution such as Full HD when the super-resolution converter 103 of the video output device 100 has not performed super-resolution conversion.

The HDMI I/F 101 receives, using the CEC, a super-resolution level (second level) indicating the performance of the resolution conversion processing by the video display device 200 from the video display device 200. Moreover, the HDMI I/F 101 receives, using the CEC, vendor information indicating the manufacturer of the video display device 200 (second vendor information). Furthermore, the HDMI I/F 101 receives EDID that is information indicating a resolution supported by the video display device 200 from the video display device 200 through the DDC. In addition, the HDMI I/F 101 transmits video data that is recorded on the BD, DVD, etc. and reproduced by the reproduction processor 104 to the video display device 200.

The determination module 102 determines whether the resolution conversion of the video data with the first resolution is necessary based on the EDID received by the HDMI I/F 101. To be more specific, the determination module 102 determines whether the resolution supported by the video display device 200 (second resolution) according to the EDID is higher than the resolution of the video data, and when the former is higher than the latter, determines that the resolution conversion is necessary.

Upon determining that the resolution conversion is necessary, the determination module 102 determines whether the vendor information of the video display device 200 (second vendor information) received by the HDMI I/F 101 matches the vendor information of the video output device 100 (first vendor information). When the two pieces of vendor information match, that is, the manufacturer of the video output device 100 and the manufacture of the video display device 200 are the same, the determination module 102 determines whether the super-resolution level of the video output device 100 (first level) is higher than the super-resolution level of the video display device 200 (second level).

The super-resolution level of each of the video output device 100 and the video display device 200 is an integer of one or more, for example. The larger the value indicated by the level, the higher the level, in other words, the higher the performance in super-resolution conversion processing. The performance of super-resolution conversion processing includes an impression of resolution, etc. for example. The performance of super-resolution conversion processing is high when the impression of resolution is high, while the performance of super-resolution conversion processing is low when the impression of resolution is low. However, the super-resolution level is not limited thereto as long as the performance of super-resolution conversion processing is represented.

The super-resolution converter 103 functions as a first resolution converter. The super-resolution converter 103 can perform super-resolution conversion processing (resolution conversion processing) for converting video data with a first resolution such as Full HD into one with a second resolution such as 4k2k higher than the first resolution. Here, the second resolution is a resolution supported by the video display device 200.

When the determination module 102 determines that the super-resolution level of the video output device 100 (first level) is higher than the super-resolution level of the video display device 200 (second level), the super-resolution converter 103 performs super-resolution conversion processing on the video data with the first resolution to convert it into video data with the second resolution.

When the determination module 102 determines that the super-resolution level of the video output device 100 is not higher than the super-resolution level of the video display device 200, the super-resolution converter 103 does not perform super-resolution conversion processing on the video data with the first resolution.

Moreover, when the determination module 102 determines that the manufacturer of the video display device 200 and the manufacture of the video output device 100 are different in the case where the vendor information of the video display device 200 and the vendor information of the video output device 100 do not match, the super-resolution converter 103 performs super-resolution conversion processing on the video data with the first resolution without comparing super-resolution levels, thereby performing resolution conversion from the video data with the first resolution into video data with the second resolution.

The following describes the super-resolution conversion processing performed by the super-resolution converter 103. The super-resolution conversion processing performed by the super-resolution converter 103 is sharpening processing for restoring video data (image signals) with a high resolution that is the second resolution by increasing the number of pixels while estimating original pixel values based on video data (image signals) with a low resolution that is the first resolution.

The "original pixel values" are values indicated by respective pixels of image signals obtained when a same object as when image signals with a low resolution (first resolution) are obtained is captured by a camera with a high resolution (second resolution). Moreover, "increasing the number of pixels while estimating" indicates that original pixel values are estimated based on an image having a high correlation in a same frame or between frames by capturing characteristics of a target image and associated with new pixels. That is, the correlation between images is used.

The super-resolution converter 103 can use, as super-resolution conversion processing, known and common techniques disclosed in Japanese Patent Application Laid-open No. 2007-310837, Japanese Patent Application Laid-open No. 2008-98803, Japanese Patent Application Laid-open No. 2000-188680, etc., for example. As a technique of super-resolution conversion processing of the embodiment, there can be used a technique of restoring images having higher frequency components than a Nyquist frequency determined depending on a sampling cycle of input images, for example.

For example, when the super-resolution conversion processing disclosed in Japanese Patent Application Laid-open No. 2007-310837 is used, a plurality of correspondent points are selected from the reference frame for each of a plurality of intermediate resolution frames, the correspondent points corresponding to a plurality of target image areas nearest to a variation pattern of the pixel value in the target image area including a target pixel in a frame, and a sample value of luminance on the correspondent point is set as the pixel value of the corresponding target pixel. Then, pixel values for a high resolution frame that has a larger number of pixels than the number of pixels of the reference frame and corresponds to the reference frame are calculated based on the sizes of a plurality of sample values and a layout of a plurality of correspondent points, so that an original pixel value is estimated based on low-resolution image signals, and the number of pixels is increased, whereby image signals with a high resolution are restored.

Moreover, when the super-resolution conversion processing using the self-congruency position search in a same frame image, which is disclosed in Japanese Patent Application Laid-open No. 2008-98803 is used, a first pixel position being the smallest error is calculated by comparing errors of respective pixels in a search area of an intermediate resolution frame, and a position of the smallest error in the search area is calculated with decimal precision based on the first pixel position and the first error thereof, and a second pixel position around the first pixel and the second error thereof. Then, a decimal-precision vector that has its endpoint at the position and its start position at a target pixel is calculated, and an extrapolation vector of the decimal-precision vector that has its end point at a pixel on a screen that is not included in the search area is calculated using the decimal-precision vector. Thereafter, pixel values of a high-resolution image having more pixels than the number of pixels included in image signals are calculated based on the decimal-precision vector, the extrapolation vector, and the pixel values acquired from the image signals. The super-resolution converter 103 restores image signals with a high resolution by increasing pixels while estimating original pixel values based on image signals with a low resolution by performing such processing.

Moreover, the super-resolution conversion processing using mapping among a plurality of frame images, which is disclosed in Japanese Patent Application Laid-open No. 2000-188680, can be also used.

However, the method of super-resolution conversion processing by the super-resolution converter 103 is not limited to the above, and any method can be applied as long as it is of processing for restoring image signals with a high resolution by increasing pixels while estimating original pixel values based on image signals with a low resolution.

Figure 3:
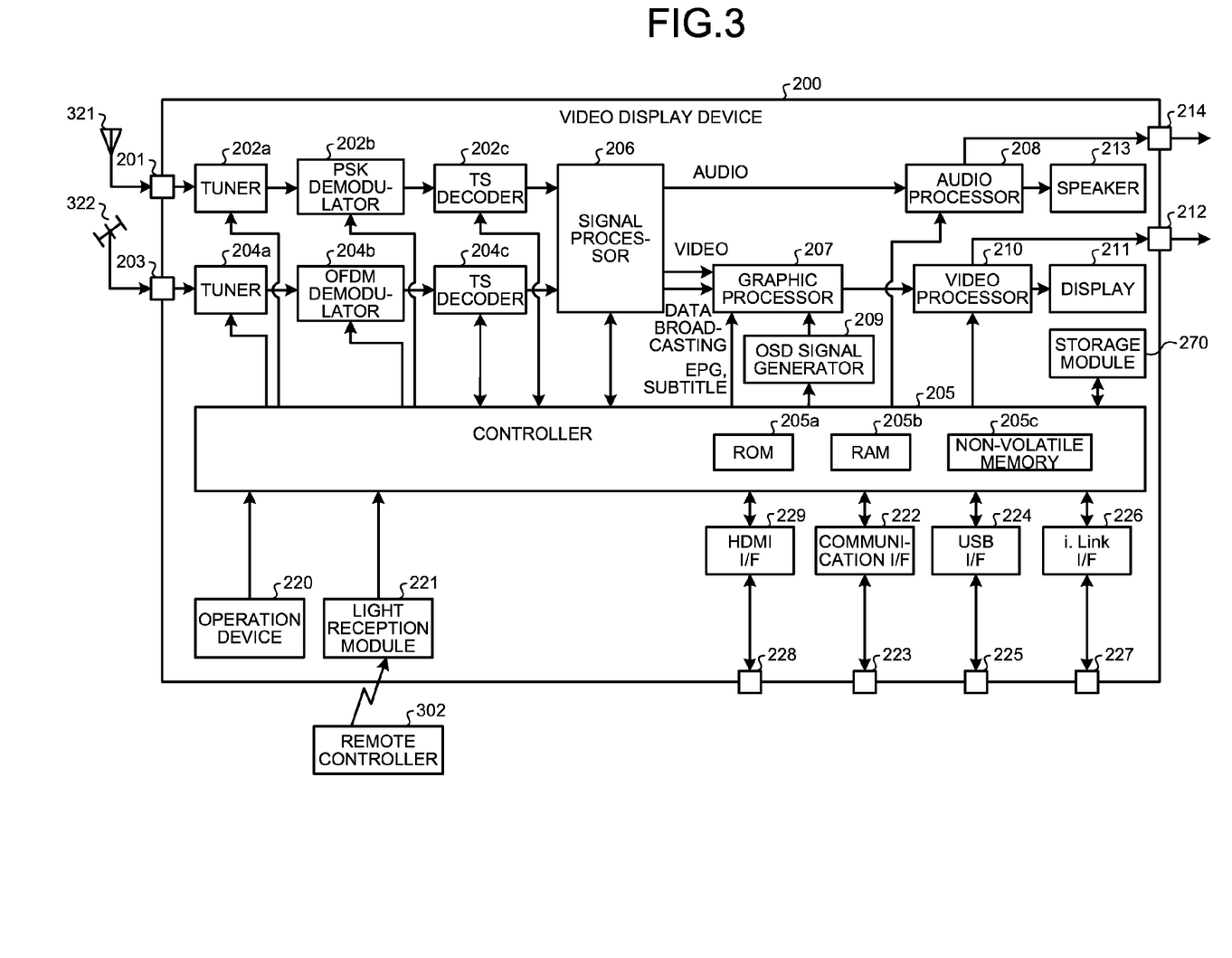
FIG. 3 is an exemplary block diagram of a main signal processing system of a video display device in the embodiment.

Next, the details of the video display device 200 are explained. As illustrated in FIG. 3, the video display device 200 mainly comprises a display 211, a speaker 213, a storage module 270, an operation device 220, a light reception module 221, a LAN terminal 223, an HDMI terminal 228, a USB terminal 225, an i.Link (registered trademark) terminal 227, broadcast signal input terminals 201 and 203, output terminals 212 and 214, tuners 202a and 204a, an HDMI I/F 229, a communication I/F 222, a universal serial bus (USB) I/F 224, an i.Link I/F 226, a phase shift keying (PSK) demodulator 202b, an OFDM demodulator 204b, TS decoders 202c and 204, a signal processor 206, an audio processor 208, a graphic processor 207, an OSD signal generator 209, a video processor 210, and a controller 205.

Digital satellite television broadcasting signals received at an antenna 321 for BS/CS digital broadcast reception are supplied to the tuner 202a for digital satellite broadcasting through the input terminal 201.

The tuner 202a selects broadcast signals of a desired channel with control signals from the controller 205, and outputs the selected broadcast signals to the PSK demodulator 202b.

The PSK demodulator 202b demodulates the broadcast signals selected by the tuner 202a with control signals from the controller 205, obtains a transport stream (TS) including the desired program, and outputs it to the TS decoder 202c.

The TS decoder 202c performs TS decoding on TS multiplexed signals with control signals from the controller 205, and outputs packetized elementary stream (PES) obtained by depacketizing digital video signals and audio signals of the desired program to the signal processor 206. Furthermore, the TS decoder 202c outputs section information transmitted by digital broadcasting to the signal processor 206.

Digital terrestrial television broadcast signals received at an antenna 322 for terrestrial broadcast reception are supplied to the tuner 204a for digital terrestrial broadcasting through the input terminal 203.

The tuner 204a selects broadcast signals of a desired channel with control signals from the controller 205, and outputs the selected broadcast signals to the orthogonal frequency division multiplexing (OFDM) demodulator 204b.

The OFDM demodulator 204b demodulates the broadcast signals selected by the tuner 204a with control signals from the controller 205, obtains a transport stream (TS) including the desired program, and outputs it to the TS decoder 204c.

The TS decoder 204c performs TS decoding on TS multiplexed signals with control signals from the controller 205, and outputs packetized elementary stream (PES) obtained by depacketizing digital video signals and audio signals of the desired program to the signal processor 206. Furthermore, the TS decoder 204c outputs section information transmitted by digital broadcasting to the signal processor 206.

In television viewing, the signal processor 206 selectively performs given digital signal processing on the digital video signals and audio signals supplied from each of the TS decoder 202c and the TS decoder 204c, and outputs them to the graphic processor 207 and the audio processor 208. In program recording, the signal processor 206 selectively performs given digital signal processing on the digital video signals and audio signals supplied from each of the TS decoder 202c and the TS decoder 204, and records them in the storage module (HDD, for example) 270 through the controller 205. Moreover, in recorded program reproduction, the signal processor 206 performs given digital signal processing on the data of a recorded program read out from the storage module (HDD, for example) 270 through the controller 205, and outputs it to the graphic processor 207 and the audio processor 208.

The graphic processor 207 has a function of synthesizing digital video signals supplied from the signal processor 206, OSD signals generated by the on-screen display (OSD) signal generator 209, video data carried by data broadcasting, an EPG and subtitle signals generated by the controller 205, and outputting them to the video processor 210. The digital video signals output from the graphic processor 207 are supplied to the video processor 210.

The video processor 210 converts the input digital video data into analog video signals that can be displayed on the display 211, and then outputs them to the display 211 for video display. In this case, the video processor 210 determines whether the resolution conversion of video data is necessary, and performs super-resolution conversion processing on video data when it is necessary and video data image quality improvement processing, for example. The details of such processing are described later.

The display 211 of the embodiment can display video data with the second resolution of 4k2k at most. Moreover, the display 211 can also output video signals to an external display (not illustrated) in a format that can be displayed on the external display for video display through the output terminal 212.

The audio processor 208 converts the input digital audio signals into analog audio signals that can be reproduced by the speaker 213, and then outputs them to the speaker 213 to reproduce voice. Moreover, the audio processor 208 can also output audio signals to an external voice output device (not illustrated) in a format that can be reproduced by the external voice output device for voice reproduction through the output terminal 214.

The controller 205 integrally controls all of the actions of the video display device 200 described above including the various reception actions. The controller 205 comprises therein a central processing unit (CPU), etc., receives operation information from the operation device 220 or receives operation information transmitted from a remote controller 302 through the light reception module 221, and controls respective modules so that the operation (channel shifting operation, etc. for example) are reflected.

In this case, the controller 205 mainly uses a read only memory (ROM) 205a that stores a control program executed by the CPU, a random access memory (RAM) 205b that provides a work area to the CPU, and a non-volatile memory 205c, such as a flash memory, that stores various kinds of setting information, control information, program information, etc.

The controller 205 is connected to the LAN terminal 223 through the communication I/F 222. Thus, the controller 205 can communicate information with a LAN-compatible device (external HDD, for example) that is connected to the LAN terminal 223 through the communication I/F 222. In this case, the controller 205 has a dynamic host configuration protocol (DHCP) server function, and allocates an internet protocol (IP) address to the LAN-compatible device that is connected to the LAN terminal 223 to control the device.

The controller 205 is connected to the USB terminal 225 through the USB I/F 224. Thus, the controller 205 can communicate information with various devices connected to the USB terminal 225 through the USB I/F 224.

Furthermore, the controller 205 is connected to the i.LINK terminal 227 through the i.LINK I/F 226. Thus, the controller 205 can communicate information with various devices connected to the i.LINK terminal 227 through the i.LINK I/F 226.

The controller 205 is connected to the HDMI terminal 228 thorough the HDMI I/F 229. Thus, the controller 205 can communicate information with various devices connected to the HDMI terminal 228 through the HDMI I/F 229. The device connected to the HDMI terminal 228 comprises an AV amplifier, a PC, a broadband rooter, etc. in addition to the video output device 100.

The HDMI I/F 229 receives video data from the video output device 100. The HDMI I/F 229 receives video data with the second resolution such as 4k2k when the super-resolution conversion has been performed in the video output device 100, and receives video data with the first resolution such as Full HD when the super-resolution conversion has not been performed in the video output device 100.

The HDMI I/F 229 uses the CEC to transmit the super-resolution level of the super-resolution conversion processing by the video display device 200 (second level) and the vendor information of the manufacturer of the video display device 200 (second vendor information) to the video output device 100. Here, the super-resolution level and the vendor information are preliminarily stored in the non-volatile memory 205c.

The HDMI I/F 229 uses the CEC to receive the super-resolution level of the super-resolution conversion processing by the video output device 100 (first level) and the vendor information indicating the manufacturer of the video output device 100 (first vendor information) from the video output device 100.

Figure 4:
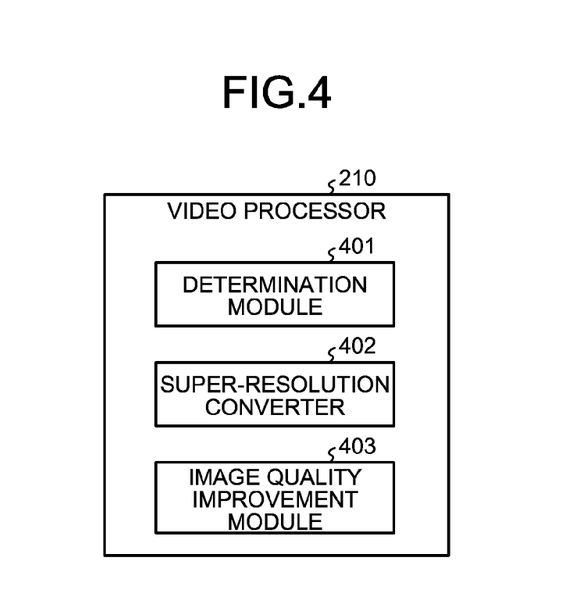
FIG. 4 is an exemplary block diagram of a functional configuration of a video processor in the embodiment.

Next, the details of the video processor 210 are described. As illustrated in FIG. 4, the video processor 210 mainly comprises a determination module 401, a super-resolution converter 402, and an image quality improvement module 403.

The determination module 401 functions as a second determination module, and determines whether the resolution of the video data received by the HDMI I/F 229 is a first resolution or a second resolution to determine the necessity of the resolution conversion. That is, the determination module 401 analyzes the resolution of the received video data, and determines, when the resolution is a first resolution such as Full HD, that the resolution conversion of the video data is necessary because the resolution is lower than a maximum resolution supported by the side of the video display device 200. When the resolution of the received video data is a second resolution such as 4k2k, the determination module 401 determines that the resolution conversion of the video data is unnecessary because the resolution is a maximum resolution supported by the side of the video display device 200.

Moreover, the determination module 401 uses the CEC to determine whether there is a super-resolution level of the video output device 100 and vendor information of the video output device 100 in the video output device 100.

The super-resolution converter 402 functions as a second resolution converter, and performs, when the determination module 401 determines that the resolution conversion of the video data is necessary, that is, when the received video data has a first resolution, super-resolution conversion processing on the video data with the first resolution to convert it into video data with the second resolution. Here, the super-resolution conversion processing performed by the second super-resolution converter 402 is the same as super-resolution conversion processing performed by the super-resolution converter 103 of the video output device 100.

When the determination module 401 determines that the resolution conversion of the video data is unnecessary, the super-resolution converter 402 does not perform super-resolution conversion processing because the video data has the second resolution.

The image quality improvement module 403 performs image quality improvement processing on video data. The image quality improvement processing includes sharpening, noise reduction, etc., but is not limited thereto. In the embodiment, when the determination module 401 determines that there is a super-resolution level of the video output device 100 and vendor information of the video output device 100 in the video output device 100, it is determined that the manufacturers of the video output device 100 and the video display device 200 are the same and the video output device 100 has performed super-resolution conversion processing on video data. Then, the image quality improvement module 403 performs image quality improvement processing in accordance with the super-resolution level of the video output device 100 on the video data with the second resolution on which the super-resolution conversion processing has been performed in the video output device 100.

To be more specific, an image quality improvement table defining the level of sharpening and the strength of noise reduction corresponding to super-resolution levels of the video output device 100 is preliminarily stored in the non-volatile memory 205c.

Figure 5:
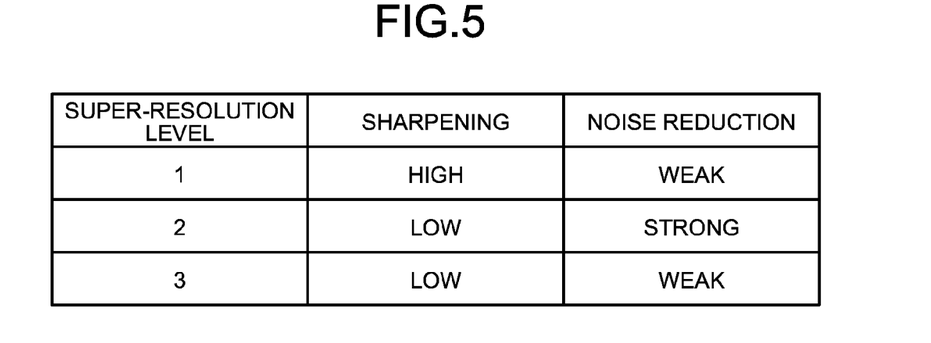
FIG. 5 is an exemplary diagram of an image quality improvement table in the embodiment.

In the image quality improvement table, the level of sharpening and the strength of noise reduction are registered corresponding to the super-resolution levels, as illustrated in FIG. 5 as an example.

To be more specific, when the super-resolution level is the lowest of "1", the impression of resolution is low but the noise amount is small. Thus, as illustrated in FIG. 5, when the super-resolution level is "1", the sharpening is set to be high and the noise reduction is set to be weak.

Moreover, when the super-resolution level is moderate of "2", the impression of resolution is high and the noise amount is large. Thus, as illustrated in FIG. 5, when the super-resolution level is "2", the sharpening is set to be low and the noise reduction is set to be strong.

Furthermore, when the super-resolution level is high of "3", the impression of resolution is high and the noise amount is small. Thus, as illustrated in FIG. 5, when the super-resolution level is "3", the sharpening is set to be low and the noise reduction is set to be weak.

The image quality improvement module 403 performs, referring to such an image quality improvement table, sharpening and noise reduction corresponding to the super-resolution level of the super-resolution conversion processing performed by the video output device 100, on the video data.

When the determination module 401 determines that there is not a super-resolution level of the video output device 100 or vendor information of the video output device 100 in the video output device 100, the manufacturer of the video output device 100 is different from the manufacturer of the video display device 200. The video output device 100 of a different vendor performs resolution conversion on video data, and there is no super-resolution level same as in the video display device 200. Thus, the image quality improvement module 403 performs normal image quality improvement processing on the video data.

The following describes video processing in the video processing system of the embodiment configured as described above. First, the video processing by the video output device 100 is described using FIG. 6.

Figure 6:
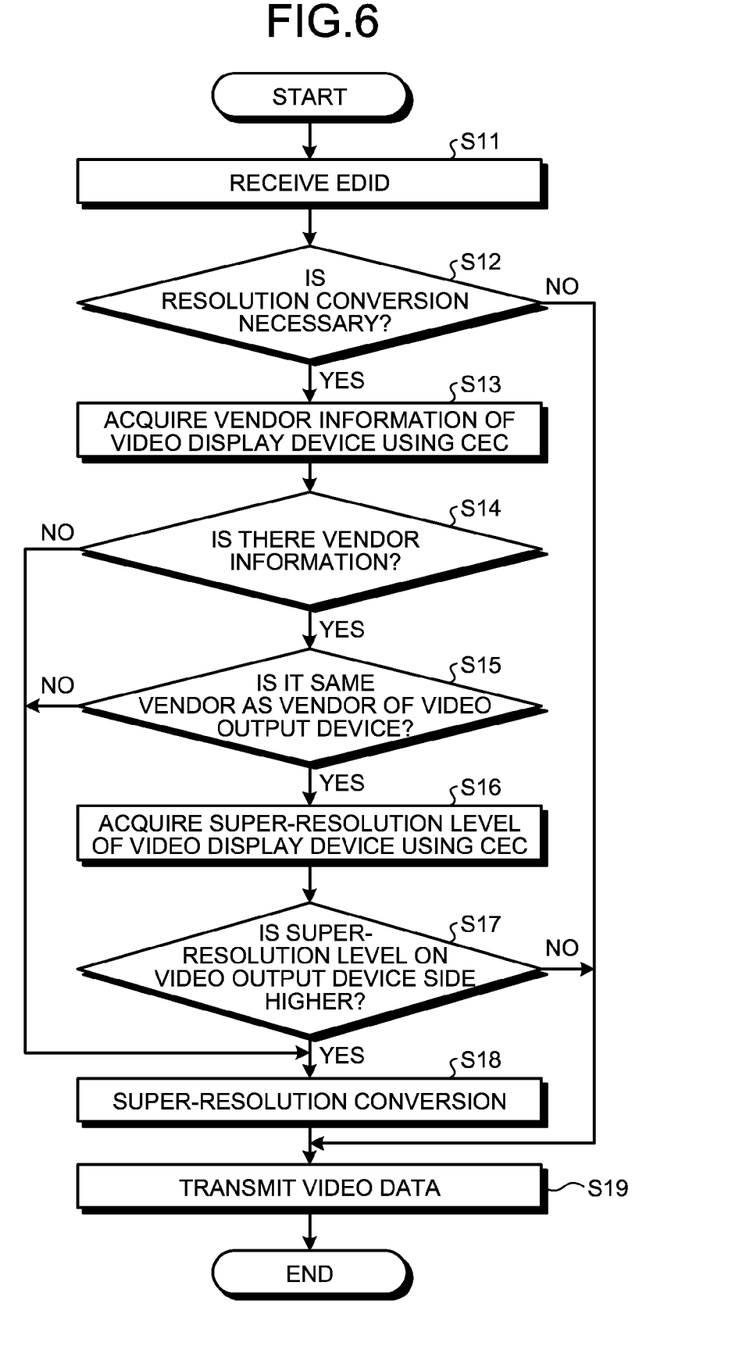
FIG. 6 is an exemplary flowchart of a procedure of video processing by the video output device in the embodiment.

First, the HDMI I/F 101 receives EDID from the video display device 200 (S11). Then, the determination module 102 determines whether the resolution conversion is necessary based on the resolution supported by the display 211 of the video display device 200, which is indicated in the EDID, and the resolution of video data reproduced by the reproduction processor 104 (S12). That is, when the resolution indicated in the EDID is higher than the resolution of the video data, the determination module 102 determines that the resolution conversion is necessary. When the resolution indicated in the EDID is not higher than the resolution of the video data, the determination module 102 determines that the resolution conversion is unnecessary.

When the determination module 102 determines that the resolution conversion is unnecessary (No at S12), the super-resolution conversion processing on the video data is not performed, and the HDMI I/F 101 transmits the video data to the video display device 200 (S19).

When the determination module 102 determines at S12 that the resolution conversion is necessary (Yes at S12), the HDMI I/F 101 use the CEC to obtain vendor information of the video display device 200 from the video display device 200 (S13). Then, the determination module 102 determines whether the vendor information of the video display device 200 has been obtained, that is, whether there is vendor information in the video display device 200 (S14).

When the determination module 102 determines that there is no vendor information in the video display device 200 (No at S14), the manufacturer of the video display device 200 is different from the manufacturer of the video output device 100, and thus the super-resolution converter 103 performs super-resolution conversion processing on the video data without comparison of super-resolution levels, etc. (S18).

When the determination module 102 determines at S14 that there is vendor information in the video display device 200 (Yes at S14), the determination module 102 further determines whether the manufacturer of the video display device 200 is the same vendor as the manufacturer of the video output device 100 based on whether the vendor information received at S13 matches the vendor information of the video output device 100 stored in the memory 110 (S15).

When the determination module 102 determines that both pieces of the vendor information do not match and the manufacturers of the video display device 200 and the video output device 100 are different (No at S15), the super-resolution converter 103 performs super-resolution conversion processing on the video data without comparison of super-resolution levels, etc. (S18).

When the determination module 102 determines at S15 that both pieces of the vendor information match and the manufacturers of the video display device 200 and the video output device 100 (Yes at S15) are the same, the HDMI I/F 101 uses the CEC to obtain a super-resolution level of the super-resolution conversion processing of the video display device 200 from the video display device 200 (S16). Then, the determination module 102 compares the obtained super-resolution level of the video display device 200 with the super-resolution level of the video output device 100 stored in the memory 110, and determines whether the super-resolution level of the video output device 100 is higher than that of the video display device 200, that is, whether the video output device 100 has higher performance (S17).

When the determination module 102 determines that the super-resolution level of the video output device 100 is higher than that of the video display device 200 (Yes at S17), the super-resolution converter 103 performs super-resolution conversion processing on the video data (S18). Then, the HDMI I/F 101 transmits the video data converted into one with the second resolution by the super-resolution conversion processing to the video display device 200 (S19).

When the determination module 102 determines at S17 that the super-resolution level of the video output device 100 is not higher than that of the video display device 200 (No at S17), the super-resolution conversion processing by the super-resolution converter 103 is not performed so that the video display device 200 performs the super-resolution conversion processing, and the HDMI I/F 101 transmits the video data with the first resolution to the video display device 200 (S19).

Figure 7:
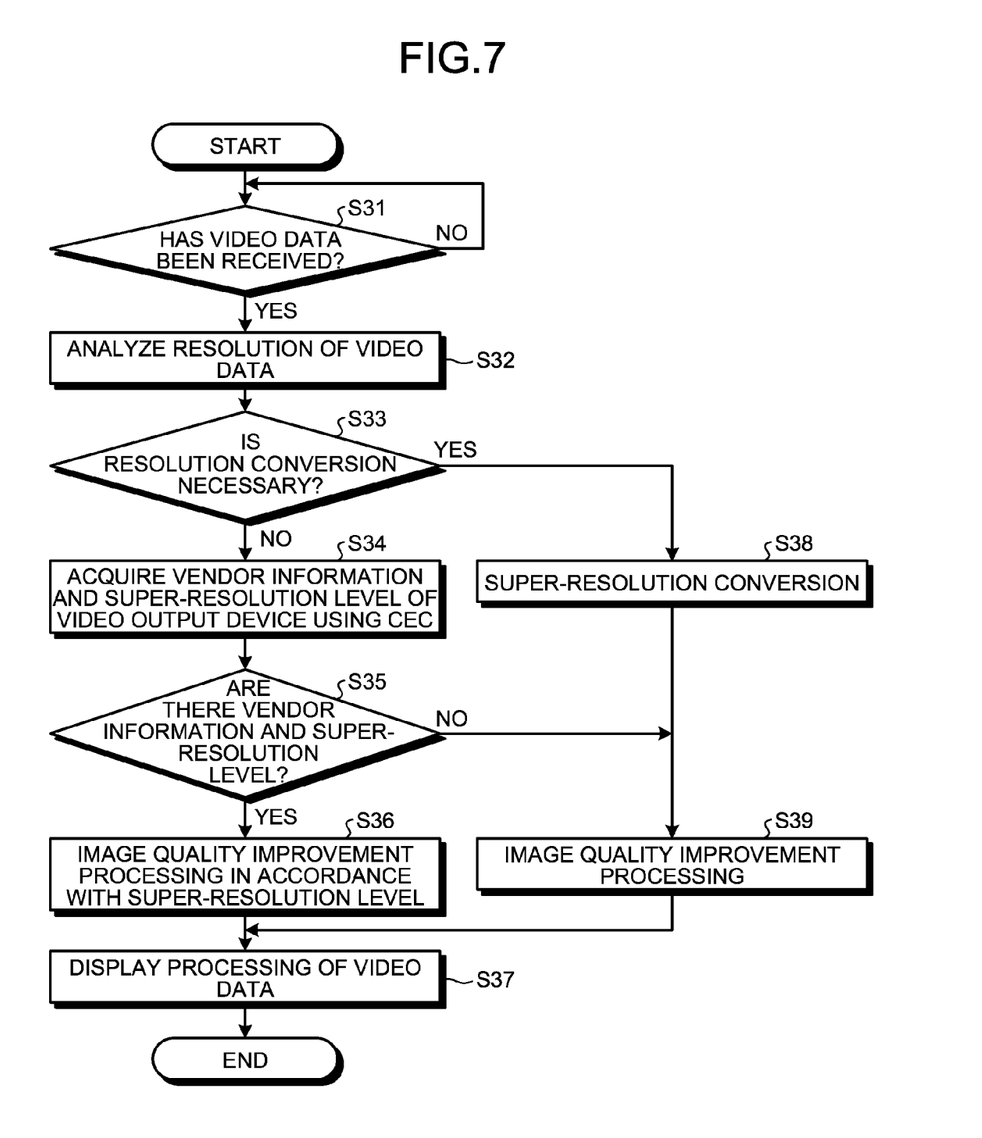
FIG. 7 is an exemplary flowchart of a procedure of video processing by the video display device in the embodiment.

Next, the video processing by the video display device 200 is described using FIG. 7.

In the video display device 200, the HDMI I/F 229 is in a state of waiting for receiving video data from the video output device 100 (No at S31). When the HDMI I/F 229 receives video data from the video output device 100 (Yes at S31), the determination module 401 analyzes the resolution of the received video data (S32). Then, the determination module 401 determines whether the resolution conversion is necessary by determining whether the resolution of the video data is the first resolution (S33).

When the determination module 401 determines that the resolution conversion is necessary because the resolution of the received video data is the first resolution (Yes at S33), the super-resolution converter 402 performs super-resolution conversion on the video data received at S31 to convert the video data with the first resolution into video data with the second resolution (S38). Thereafter, the image quality improvement module 403 performs normal image quality improvement processing (sharpening, noise reduction) on the video data with the second resolution (S39). Then, the video processor 210 displays the video data with improved image quality on the display 211 (S37).

When the determination module 401 determines that the resolution conversion is unnecessary because the resolution of the received video data is the second resolution (No at S33), the HDMI I/F 229 uses the CEC to obtain a super-resolution level and vendor information of the video output device 100 from the video output device 100 (S34). Then, the determination module 401 determines whether the super-resolution level and the vendor information have been received from the video output device 100, that is, whether there are a super-resolution level and vendor information in the video output device 100 (S35).

When the determination module 401 determines that there is no super-resolution level or vendor information in the video output device 100 (No at S35), it is determined that the manufacturers of the video output device 100 and the video display device 200 are different, and the image quality improvement module 403 performs normal image quality improvement processing on the video data (S39).

When the determination module 401 determines at S35 that there are a super-resolution level and vendor information in the video output device 100 (Yes at S35), it is determined that the manufacturers of the video output device 100 and the video display device 200 are the same, and the image quality improvement module 403 performs, referring to the image quality improvement table of FIG. 5, image quality improvement processing (sharpening, noise reduction) in accordance with the super-resolution level of the video output device 100 obtained at S34, on the video data (S36). Then, the video processor 210 displays the video data with improved image quality on the display 211 (S37).

In this manner, in the embodiment, the video output device 100 obtains a super-resolution level of the super-resolution conversion processing from the video display device 200 through bidirectional communication using the CEC, compares it with a super-resolution level of the super-resolution conversion processing of the video output device 100, and performs resolution conversion of the video data in the video output device 100 when the super-resolution level of the video output device 100 is higher than that of the video display device 200. When the super-resolution level of the video output device 100 is not higher than that of the video display device 200, the video display device 200 performs the resolution conversion of the video data. Thus, the embodiment makes it possible to prevent the resolution conversion of video data from being performed always in the video output device 100 and display video data with image quality intended by the manufacturer.

Moreover, in the embodiment, when the super-resolution conversion processing on video data is performed by the video output device 100 of the same vendor as the video display device 200, the video display device 200 performs image quality improvement processing in accordance with the super-resolution level of the video output device 100 on the video data after super-resolution conversion, and thus the video data with higher image quality can be displayed.

First Modification

In the above-described embodiment, the determination module 401 in the video display device 200 determines whether the resolution of the video data received from the video output device 100 is the second resolution to determine the necessity of the resolution conversion in the video display device 200. However, the embodiment is not limited thereto.

For example, it may be configured such that, when the super-resolution conversion processing has not been performed on the side of the video output device 100, the HDMI I/F 101 uses the CEC to transmit notification indicating that the super-resolution conversion processing has not been performed to the video display device 200. After the HDMI I/F 229 of the video display device 200 receives the notification, the determination module 401 determines, based on whether there is the notification, whether the resolution conversion on the side of the video display device 200 is necessary.

That is, it is possible to configure the determination module 401 to determine that the resolution conversion processing in the video display device 200 is necessary when the notification indicating that the super-resolution conversion processing has not been performed is received from the video output device 100.

Second Modification

In the above-described embodiment, each of the video output device 100 and the video display device 200 stores therein a predetermined super-resolution level of super-resolution conversion processing. However, the embodiment is not limited thereto. For example, there may be a plurality of super-resolution levels, so that a user can select a desired super-resolution level to perform super-resolution conversion processing with the selected super-resolution level.

In such a case, in the video output device 100, the HDMI I/F 101 is configured to obtain, from the video display device 200, the super-resolution level highest in performance or the super-resolution level already selected by the user among the plurality of super-resolution levels. Then, the determination module 102 may be configured to determine whether the super-resolution conversion processing is performed by the video output device 100 based on the comparison of the super-resolution level with the super-resolution level highest in performance or the super-resolution level selected by the user among a plurality of super-resolution levels in the video output device 100.

Third Modification

Figure 8:
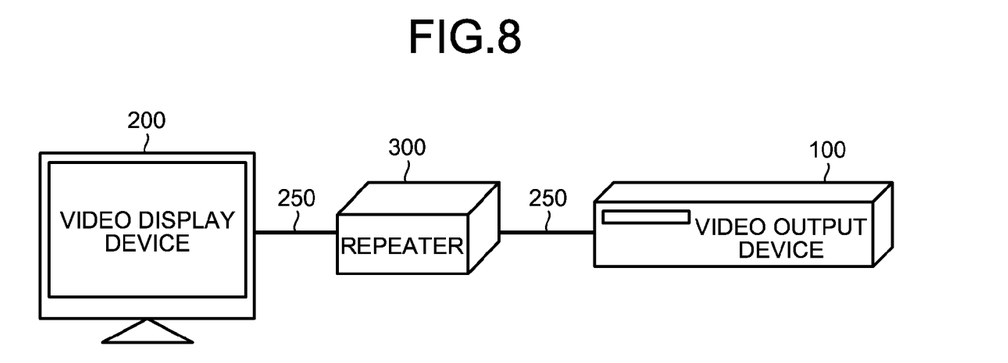
FIG. 8 is an exemplary diagram of a configuration of a video processing system according to a third modification.

This modification has a configuration in which a repeater 300 is interposed between the video output device 100 and the video display device 200 and connected to them through HDMI cables 250, as illustrated in FIG. 8. The repeater 300 comprises an amplifier for example, but is not limited thereto. The bidirectional communication using the CEC is also possible between the video output device 100 and the repeater 300 and between the repeater 300 and the video display device 200.

In the modification, the communication between the video output device 100 and the video display device 200 is the same as the above-described embodiment except that the communication is performed through the repeater 300. That is, in the modification, the video output device 100 can receive the super-resolution level and vendor information from the video display device 200 through the repeater 300 in bidirectional communication using the CEC, and the video display device 200 can also receive the super-resolution level and vendor information from the video output device 100 through the repeater 300 in bidirectional communication using the CEC.

Thus, the modification makes it possible to perform the same processing as the above-described embodiment, and exerts the same effects as the above-described embodiment.

Note that, in the above-described embodiment and the above-described modifications, the super-resolution level is used as an indicator representing the performance of super-resolution conversion processing. However, the indicator is not limited thereto. For example, the version numbers of the super-resolution converters 103 and 402 performing super-resolution conversion processing can be used as indicators representing the performance of super-resolution conversion thereof. That is, the determination modules 102 and 401 can be configured to determine that the super-resolution converters 103 and 402 have higher performance as the version numbers of the super-resolution converters 103 and 402 are higher.

Moreover, the above-described embodiment and the above-described modifications adopt super-resolution conversion processing as resolution conversion processing. However, the resolution conversion is not limited thereto as long as the processing is for converting the resolution of video data.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A video processing system, comprising:
a video output device; and
a video display device connected to the video output device so that bidirectional communication is possible, wherein the video output device comprises:
   a first resolution converter configured to perform resolution conversion processing for converting video data with a first resolution into video data with a second resolution higher than the first resolution, at a first level indicating performance of the resolution conversion processing;
   a first reception module configured to receive a second level indicating performance of resolution conversion processing of the video display device from the video display device through the bidirectional communication;
   a first determination module configured to determine whether the first level is higher than the second level; and
   a first transmission module configured to transmit the video data to the video display device, and
the first resolution converter is configured to convert the video data with the first resolution into the video data with the second resolution when the first level is higher than the second level, and the video display device comprises:
- a second reception module configured to receive the video data from the video output device;
- a second resolution converter configured to perform resolution conversion processing for converting the video data with the first resolution into the video data with the second resolution at the second level; and
- a display configured to display the video data with the second resolution, and the second resolution converter is configured not to perform the resolution conversion processing when the video data with the second resolution is received.

2. A video output device, comprising:
- a resolution converter configured to perform resolution conversion processing for converting video data with a first resolution into video data with a second resolution higher than the first resolution, at a first level indicating performance of the resolution conversion processing;
- a reception module configured to receive, from a video display device connected to the video output device so that bidirectional communication is possible, a second level indicating performance of resolution conversion processing of the video display device through the bidirectional communication;
- a determination module configured to determine whether the first level is higher than the second level; and
- a transmission module configured to transmit the video data to the video display device, wherein the resolution converter is configured to convert the video data with the first resolution into the video data with the second resolution when the first level is higher than the second level.

3. The video output device of claim 2, wherein
when the first level is not higher than the second level, the resolution converter is configured not to perform resolution conversion processing on the video data with the first resolution, and
the transmission module is configured to transmit the video data with the first resolution to the video display device.

4. The video output device of claim 2, wherein
the reception module is configured to receive second vendor information indicating a manufacturer of the video display device from the video display device through the bidirectional communication, and
the determination module is configured to determine whether the second vendor information matches first vendor information indicating a manufacturer of the video output device and determine, when the second vendor information matches the first vendor information, whether the first level is higher than the second level.

5. The video output device of claim 4, wherein when the second vendor information does not match the first vendor information, the resolution converter is configured to convert the video data with the first resolution into the video data with the second resolution.

6. The video output device of claim 2, wherein when the resolution converter has not performed the resolution conversion processing, the transmission module is configured to transmit notification indicating that resolution conversion processing has not been performed on the video data to the video display device thorough the bidirectional communication.

7. The video output device of claim 2, wherein
the first level comprises a plurality of first levels,
the second level comprises a plurality of second levels,
the resolution converter is configured to perform the resolution conversion processing at the plurality of first levels,
the video display device is configured to perform the resolution conversion processing at the plurality of second levels,
the reception module is configured to receive a highest second level among the plurality of second levels from the video display device through the bidirectional communication,
the determination module is configured to determine whether a highest first level among the plurality of first levels is higher than the highest second level, and
the resolution converter is configured to convert the video data with the first resolution into the video data with the second resolution when the highest first level is higher than the highest second level.

8. A video processing method performed in a video output device and a video display device connected to the video output device so that bidirectional communication is possible,
the video output device configured to perform resolution conversion processing for converting video data with a first resolution into video data with a second resolution higher than the first resolution, at a first level indicating performance of the resolution conversion processing, and
the video display device configured to perform resolution conversion processing for converting the video data with the first resolution into the video data with the second resolution, at a second level indicating performance of the resolution conversion processing, and
the video processing method comprising:
receiving, by the video output device, the second level from the video display device through the bidirectional communication;
determining, by the video output device, whether the first level is higher than the second level;
converting, by the video output device, the video data with the first resolution into the video data with the second resolution when the first level is higher than the second level;
transmitting, by the video output device, the video data to the video display device;
receiving, by the video display device, the video data from the video output device; and
when the video data with the second resolution is received, displaying, by the video display device, the video data with the second resolution without performing the resolution conversion processing.

* * * * *